G. R. GAY & J. C. STREIBICH.
RESILIENT WHEEL.
APPLICATION FILED FEB. 25, 1911.
997,549.
Patented July 11, 1911.
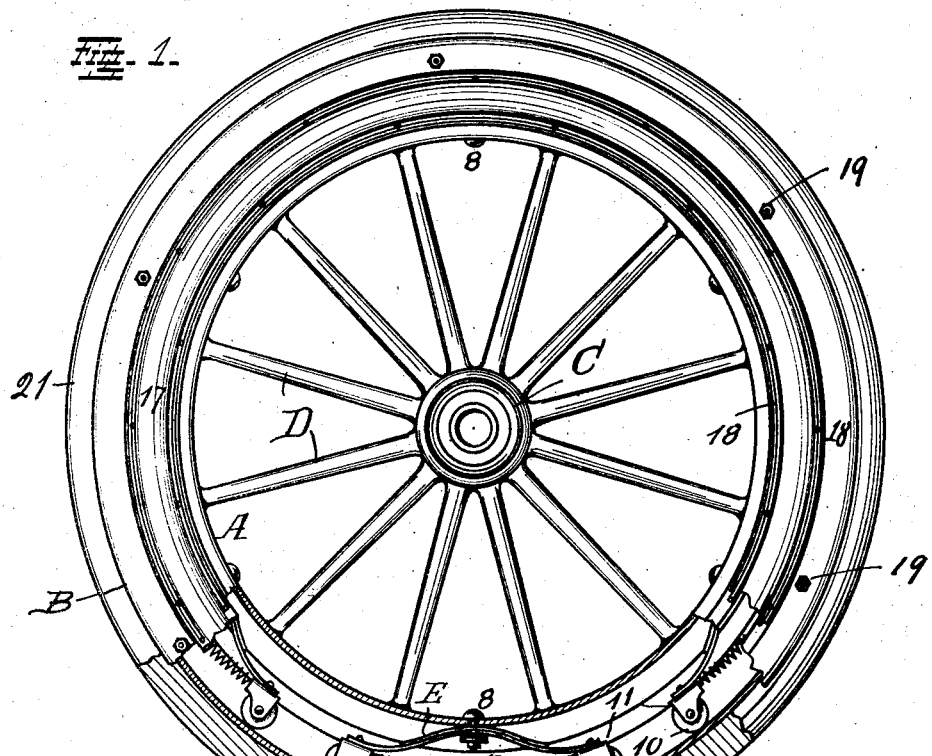
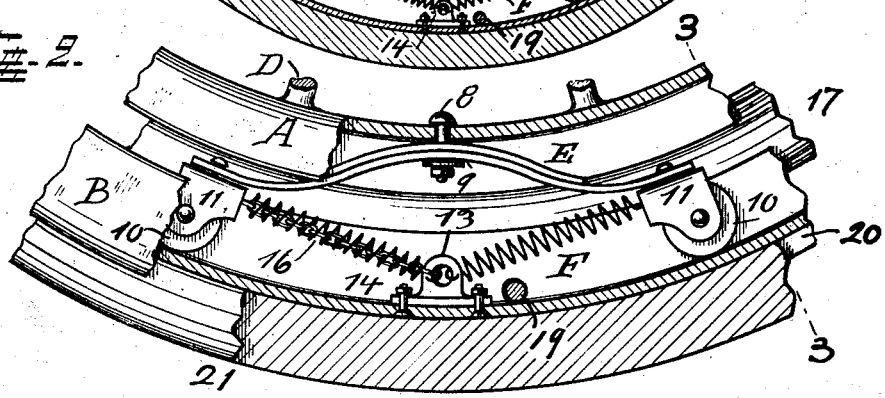
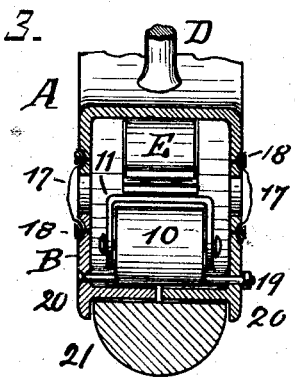
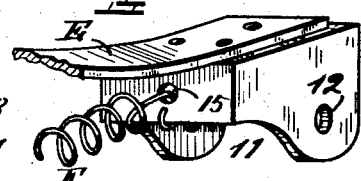
Witnesses.
T. LeBeau.
M. Stenz.
Inventors.
George R. Gay
John C. Streibich
by C. Spengel Atty

UNITED STATES PATENT OFFICE.

GEORGE R. GAY AND JOHN C. STREIBICH, OF LITTLE ROCK, ARKANSAS.

RESILIENT WHEEL.

997,549. Specification of Letters Patent. Patented July 11, 1911.

Application filed February 25, 1911. Serial No. 610,809.

*To all whom it may concern:*

Be it known that we, GEORGE R. GAY and JOHN C. STREIBICH, citizens of the United States, both residing at Little Rock, Pulaski county, State of Arkansas, have invented certain new and useful Improvements in Resilient Wheels; and we do declare the following to be a clear, full, and exact description of the invention, attention being called to the drawing which accompanies this application and forms a part thereof.

This invention relates to improvements in the construction of wheels in which springs are used to impart resiliency obtained by means of pneumatic tires to overcome vibration of the axle and to neutralize effects of jars upon the same when the wheels travel over rough and uneven ground.

The invention consists of the construction hereinafter described and pointed out in the claim and as illustrated in the accompanying drawing, in which:—

Figure 1, illustrates our improved wheel in side-elevation with parts shown broken away and in section. Fig. 2, shows a portion of Fig. 1, at enlarged scale. Fig. 3, is a cross-section through the outer part of the wheel and on a line indicated at 3—3 in Fig. 2. Fig. 4, shows in perspective view one of the parts viz. a box used in the construction of the wheel.

Two rims are used in the construction of this wheel, an inner one A, and an outer one B, yieldingly spaced therefrom by a number of springs interposed between them and holding them normally in concentric relation.

C is the hub and D are the spokes holding hub and inner rim A rigidly to each other.

We use two sets of springs to hold the rims yieldingly spaced from each other, leaf spring E connected to one rim and coil springs F connected to the other rim. The leaf springs may consist of one or more leaves and we prefer to connect them to the inner rim A, bolts 8 being used and applied between their ends with a washer 9 interposed. The action of these springs is transmitted to the outer rim by means of rollers 10, mounted in boxes 11 which are rigidly connected to the free ends of these springs by bolts or rivets. The opposite sides in each box are provided with openings 12 which receive the journals of these rollers. (See Fig. 4.) The action of these leaf-springs is augmented by coil-springs F, two being used in connection with each leaf-spring and connected at one of their ends to boxes 11 and at their other end to a fitting provided on the inside of the outer rim and opposite the point of connection of the leaf springs to the inner rim. These fittings consist of an eye 13 and of a flanged base 14 attached by screws or rivets to the outer rim. The coil springs may have hooks formed on each end, to facilitate their connection, and one of which engages eye 13 and the other an opening 15 in boxes 11. As the inner rim vibrates when the wheel is under load, the affected springs yield accordingly and the rollers move on the outer rim. To prevent one rim from moving independently in a rotary direction with reference to the other one under excessive strain, we may provide chains 16 in one or more places which connect one of boxes 11 to eye 13 of the nearest fitting and limit positively any movement of this kind. These chains are by preference contained within the coil-springs which connect these particular members as shown in Fig. 2. Both rims are of substantially U-shaped cross-sectional profile with their open sides opposite each other as best shown in Fig. 3, but with their free edges spaced from each other to prevent contact when the vibrating rim moves to or from the other one. The space between the sides of the two rims is closed by annular strips 17 of pliable material, leather or canvas for instance, which strips are held in place by rings 18 forced into annular grooves provided around the edges of the rims. For convenience in manufacture the outer rim is made in two sections, laterally connected by bolts 19. Flanges 20 are provided on the outer rim which receive between them a cushion tire 21.

Having described our invention, we claim, as new:

In a resilient wheel, the combination of an inner rim, an outer rim spaced therefrom, leaf-springs connected between their ends to the inner rim, boxes containing rollerbearings provided on the free ends of these springs, rollers mounted in these boxes and in contact with the outer rim, a coil-spring connected at one end to each box and an attaching device on the outer rim and between the rollers to which the other ends of the coil-springs connect.

In testimony whereof, we hereunto affix our signatures in the presence of two witnesses.

GEORGE R. GAY.
JOHN C. STREIBICH.

Witnesses:
G. D. M. HENDERSON,
J. H. JONES.

Copies of this patent may be obtained for five cents each, by addressing the "Commissioner of Patents, Washington, D. C."